United States Patent Office 3,531,760
Patented Sept. 29, 1970

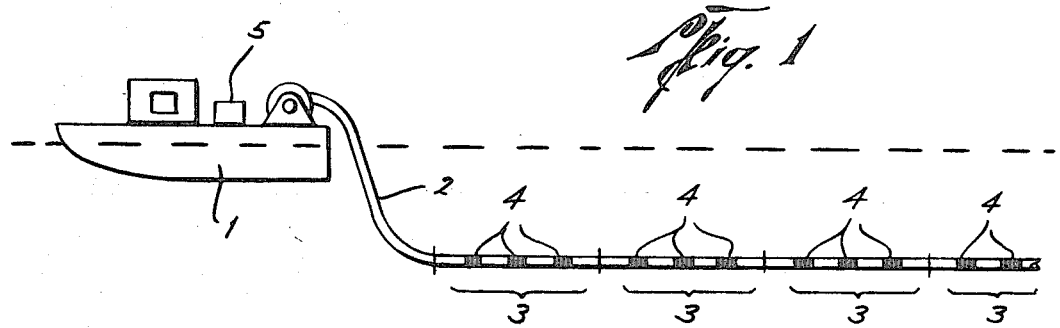
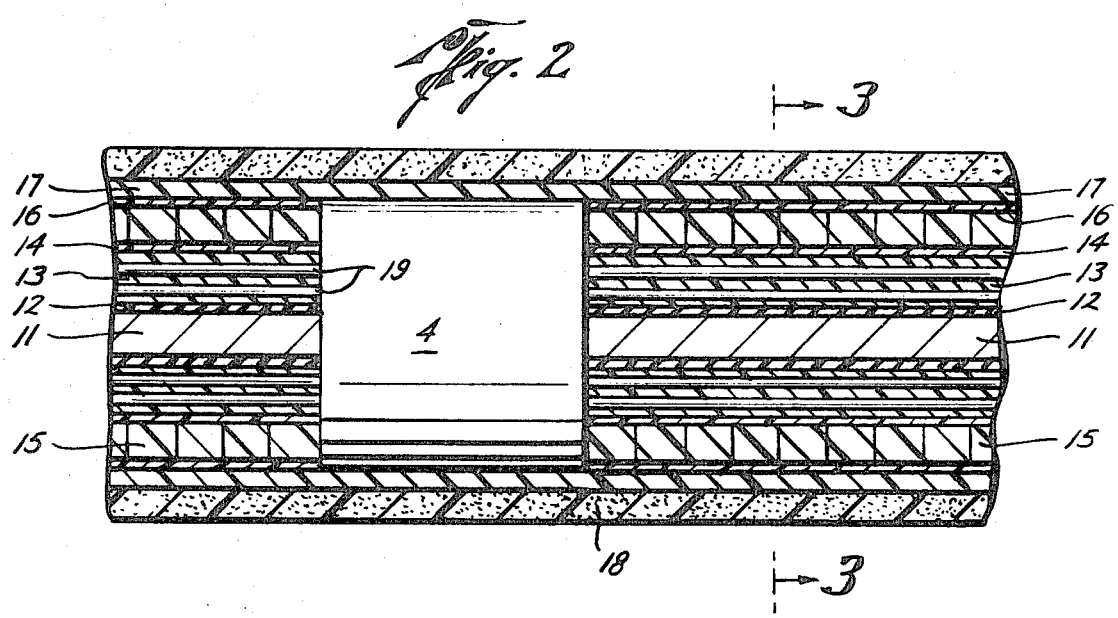
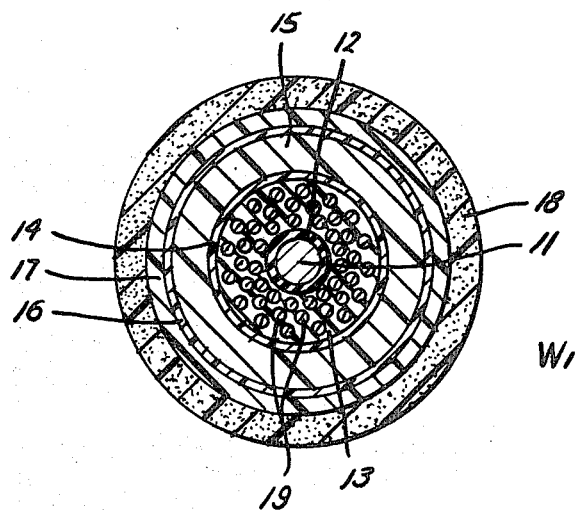
William A. Whitfill, Jr.
INVENTOR.
BY
ATTORNEY

3,531,760
SOLID SEISMIC STREAMER
William A. Whitfill, Jr., Houston, Tex., assignor to Schlumberger Technology Corporation, New York, N.Y., a corporation of Texas
Filed Sept. 12, 1968, Ser. No. 759,448
Int. Cl. G01v 1/38
U.S. Cl. 340—7                        12 Claims

ABSTRACT OF THE DISCLOSURE

Disclosed is a solid streamer cable for use in marine seismic exploration. The solid streamer cable is comprised of a plurality of sections of seismic cable, each section containing a plurality of seismic wave sensitive transducers and coupled in end to end relationship. The body of the solid seismic streamer is composed of a plurality of layers of cable material. From the center of the cable, these layers consist of the following: a torque balanced wire rope forming a central support for the cable, an insulating jacket about the wire rope, a plurality of twisted pair leads for the marine seismic transducers, the leads being embedded in a filler material, a layer of cloth tape, and overlying this structure a layer of cellular filler material wrapped with a layer of plastic tape. Extruded over the last mentioned layer is a water-tight sealant layer. Finally, an outer flotation layer of cellular material is provided to achieve a desired buoyancy.

BACKGROUND OF THE INVENTION

This invention relates to marine seismic exploration systems and more particularly to a marine seismic cable, employing apparatus for sensing reflected seismic waves from subterranean earth formations.

In performing seismic exploration beneath the surface of the water, it is conventional practice for ships to tow long seismic streamer cables behind them in the water. These cables generally carry detector apparatus such as seismic transducers, or hydrophones which detect reflected acoustic wave energy and provide signals representative thereof. A sound source such as dynamite is commonly utilized to introduce an acoustical wave front into the earth formations underlying the body of water being explored and the hydrophones pick up seismic waves reflected from geological structures in the underlying formations. Cables utilized for this purpose may typically be several thousands of feet long and comprise many sections of cable coupled in end to end relation. Such cables are usually constructed so as to have a neutral buoyancy in the water and frequently, means are utilized to maintain the level of the entire cable at a constant depth in the water. Further, such cables may carry depth detecting apparatus disposed at intervals along their length in order to determine accurately the cable's depth in the water at several points along the cable.

Prior art cables utilized for this purpose have typically been comprised of sealed cable sections filled with a fluid which is electrically non-conducting, such as oil, in order to maintain their neutral buoyancy. Such cables are subject to several shortcomings. Perhaps foremost among these shortcomings has been leakage of the oil from the cable. In such a case, it is impossible for the cable's neutral buoyancy to be maintained. If a leak develops, it is not uncommon for the interior of a cable section to fill up with water thus causing that section or possibly several sections of the cable to sink.

Another shortcoming of such prior art liquid filled cables has been water seepage entering the cable. If this occurs, the presence of DC voltages on conductors within the cable can cause electrolysis problems on the metallic cable connectors and the wiring carried within the cable. As a result, serious corrosion problems can affect the cable wiring and the metallic connectors used to join sections of the seismic cable together. Further, intermittent DC current leakage through salt water seepage which has entered the cable can cause large voltages to appear in the hydrophone leads which run the length of the cable and can seriously affect the accuracy of the hydrophone output. Hydrophone signal levels are typically very low, on the order of a few microvolts, thus only a slight amount of salt water seepage in the cable when using relatively high DC voltages to power the cable depth detectors can superimpose a relatively low frequency varying DC component on the hydrophone outputs and mask their signals entirely. Additionally, salt water seepage entering the oil filled portion of the cable can effectively place random resistances in parallel across the depth detector transducers and thereby cause loss of sensitivity of the depth sensors.

Another problem which frequently occurs in utilizing liquid filled seismic streamers is breakage of the seismic transducers when the cable is reeled back onto the tow ship. This occurs because the transducers distributed along the sections of the cable are typically very fragile and subject to breakage as the cable is reeled across the winch on the towing ship. Also the construction of prior art oil filled cables has offered little protection to prevent such transducer damage.

In other seismic exploration applications, so called "bay cables" are used to explore beneath the surface of shallow bodies of water. In this application, a seismic cable is laid along the bottom of a rather shallow body of water and then the seismic sound source is utilized to induce reflected seismic waves from geological structures disposed beneath the earth underlying the body of water. In this application, neutral buoyancy is not required. However, the seismic cables utilized for such shallow water exploration must be very rugged physically as they are subject to being dragged across rough bottoms of bays or other shallow bodies of water. Typical prior art "bay cables" have utilized a rather small diameter solid cable core to carry the electrical conductors to the seismic wave transducers but have utilized tranducers on the cable's exterior. Such transducers typically are of a hollow cylindrical form with the cable body passing through the hole in the center of the cylinder. A takeout of electrical leads from the cable is necessary to couple the transducer electrically to the cable.

The disadvantages of such "bay cables" are readily apparent when considering that the cable jacket must have a plurality of takeout openings disposed along its length, each of which is subject to water seepage. Also since the seismic wave transducers are exterior to the cable they are more subject to breakage as the cable is reeled in and out and dragged across the bottoms of the shallow bodies of water being explored.

Accordingly, it is an object of the present invention to provide a new and improved marine seismic cable which obviates many of the foregoing difficulties. This cable is constructed in such a manner as to have much more rugged physical characteristics than prior art liquid filled cables, and yet at the same time maintains a neutral buoyancy for use in deep water exploration. Additionally, it provides the rugged construction desirable in shallow water "bay cables."

SUMMARY OF THE INVENTION

In accordance with the present invention, a marine seismic cable is provided which utilizes a novel solid layer construction about a central core. The cable provides efficient water tight sealing for a plurality of seismic transducers carried at spaced intervals along its length. Additionally, the cable may carry a plurality of marine depth detectors disposed at intervals along its length.

A central wire rope core is utilized to provide the basis for the construction of the present cable. About this central core, a plurality of sealed water tight layers is provided, each of which functions to increase the strength and physical ruggedness of the cable as well as providing a water tight, neutrally buoyant structure in the final formed cable. Seismic wave transducers are dispersed at lengths along the cable and connected through a wiring bundle carried in an internal layer of the cable.

The novel features of the present invention are set forth with particularity in the appended claims. The present invention, both as to its organization and manner of operation, together with further objects and advantages thereof may best be understood by way of illustration and an example of an embodiment when taken in conjunction with the accompanying drawings.

BRIEF DESCRIPTION OF THE DRAWINGS

FIG. 1 is a schematic view showing the seismic cable of the present invention being towed through the water behind a boat.

FIG. 2 is a longitudinal view, partially in section, showing a portion of the cable comprising its several layers.

FIG. 3 is a cross sectional view along line 3—3 of FIG. 2 further detailing the layered construction of the present invention.

DESCRIPTION OF THE PREFERRED EMBODIMENT

Referrnig now to FIG. 1, a towing boat 1 is shown pulling seismic cable 2 of the present invention through a body of water. Cable 2 is comprised of a plurality of individual cable sections 3 connected in end to end relationship. Each cable section carries a plurality of seismic wave transducers 4, for example, those described in applicant's prior application Ser. No. 726,373, filed May 3, 1968, and entitled Shatterproof Hydrophone which is assigned to the assignee of the present application.

Referring now to FIGS. 2 and 3, the details of the cable 2 construction may be seen. A torque balanced wire rope 11 is utilized as a base member in the construction of the cable of the present invention. This wire rope functions to give great tensile strength to the present cable. It may be accurately stated that wire rope 11 forms the "backbone" of the cable. The torque balanced property of wire rope 11 insures that the rope will not tend to unravel as tension is applied to it and subsequently released. The torque balanced property of the wire rope core additionally prevents the rope from twisting as tension is applied to it. This, in turn, prevents conductors 19 from being subjected to possible twisting and subsequent breakage resulting therefrom which could occur if wire rope 11 twisted.

On the exterior surface of the central wire rope 11 an insulation layer 12 is extruded which may be of rubber, neoprene, plastic or the like. Layer 12 functions to insulate wire rope 11 from the electrical conductors carried in the cable and further to prevent any possible water seepage entering the cable from contacting wire rope 11 and weakening it by corrosion. Cable wound about layer 12 are a plurality of twisted pair, electrical conductor leads which are suitably connected to selected seismic wave transducers 4 or depth detector sections which are carried by the cable. The conductor leads provide a connection to recording apparatus 5 carried on the boat. Twisted pairs 19 are embedded in water-blocking filler layer 13, which may be polysulfide or the like. Layer 13 is applied as a filler about the twisted pairs as the jacketed wire rope and twisted pairs leave the cabling machine. Filler layer 13 also functions to block water and prevent migration down the cable of any water which possibly might seep that far into its interior.

Layer 14 which overlies filler layer 13 is a wrapping of cloth tape or the like which permits easy handling of the cable of sub-assembly during the manufacturing process while polysulfide layer 13 is still in a tacky condition just after leaving the cabling machine. Cellular filler layer 15 is comprised of a helical coil of cellular material such as polyethelene or the like. This layer functions to fill the gap between the inner twisted conductor pairs and the outer diameter of the hydrophones 4 carried in the cable. Cellular filler layer 15 is applied as a continuous helical coil. It is wound about the cable's inner structure in a continuous manner. The helical coil nature of this layer results in the finished cable having much more flexibility than if this layer were a solid extruded layer. Overlying cellular filler layer 15 is an additional layer of tape 16 which may be Mylar tape or the like. This tape is utilized to retain the helically wound layer 15 during the manufacturing process and additionally provides another water tight sealant layer which aids in the prevention of water migration along the cable if a leak occurs.

When helically wound layer 15 and the seismic wave transducers 4 are in place and tape layer 16 has been wrapped, the cable then has a sealing layer 17 which may be neoprene, rubber, or plastic, extruded over this structure. Layer 17 functions as a water sealing layer and is of sufficient thickness to withstand punctures due to rough handling of the cable such as by winding it onto a winch or dragging it along the bottom of a shallow body of water. The primary purpose of layer 17 is to protect the interior of the cable from water seepage. However, should water seepage occur through a puncture in layer 17, the migration of water along the cable is prevented by filler layer 15 and further by filler layer 13 of the cable. Further protection is offered by the other water tight layers of the cable as well. Thus, if a leak occurs through sealing layer 17, only an isolated portion of the cable would be exposed to water seepage and the leak would have to occur very near a transducer in order for the output of that transducer to be affected. This resistance against water migration also insures that if a leak occurs that the entire cable will not become water logged and sink.

Finally, the outer flotation layer 18 which may be of a cellular polyethylene material is extruded over sealing layer 17 and may be provided in whatever thickness is necessary to achieve the desired buoyancy for the entire cable structure. The material of layer 18 preferably is a controlled density foamed polyethylene material. By suitable choice of its density and thickness, it is possible to achieve a neutral or slightly positive buoyancy.

The cable provided by the above construction constitutes a very rugged seismic streamer cable which is not subject to breakage by pulling through the water or over the bottom of a shallow body of water. The hydrophones carried by the cable are covered by two layers of protective material (layers 17 and 18) which prevents damage to them which might otherwise occur if they were exterior to the cable as in the case of prior art "bay cables." The sealed construction of the present invention, together with its controlled neutral buoyancy prevents possible sinking of cable sections as have occurred with prior art liquid filled cables when punctured.

Additionally, if a leak penetrates as far as through layer 17 of the present invention, the water will not damage the entire cable section because of the resistance of the cable structure to the migration of water within the cable. A further advantage of the present invention is that a damaged hydrophone may easily be repaired by sripping away the overlying layers in the vicinity of the hydrophone, replacing the hydrophone, and then extruding a sealing material in place to replace the removed outer layers of the cable.

While one particular embodiment of the present invention has been shown and described, it is apparent that changes may be made without departing from this invention in its broader aspects and therefore the aim in the appended claims is to cover all such changes and modifications as fall within the true spirit and scope of this invention.

What is claimed is:

1. A solid cable construction for use in marine seismic exploration comprising:

a cable section having a coaxially aligned, layered construction comprising an inner, flexible, load supporting member; a moisture proof electrical insulating jacket disposed around said load supporting member; a first layer of electrical conductors and filler material overlying said electrical insulating jacket; a helical coil of cellular filler material overlying said first layer and forming a second filler layer; a layer of moisture sealant material overlying said second filler layer; and, an outer overlying layer of solid flotation material of sufficient thickness to provide a neutral or slightly positive bouyancy.

2. A cable section as defined in claim 1 and further including a plurality of hollow, cylindrical, seismic transducers carried internally by said cable section and disposed in longitudinal spaced relationship along the length of said cable section, the exterior wall of said transducers being disposed within said layer of sealant material, said second filler layer being in longitudinal sections having end wall surfaces and the end walls of said hollow cylindrical transducers being disposed between said end wall surfaces for containment of said transducers in a relatively fixed position within said cable section.

3. A cable section as defined in claim 1 and further including a layer of cloth tape material disposed over said first filler layer between said first filler layer and said second filler layer.

4. A cable section as defined in claim 3 and further including a layer of plastic tape material disposed over said second filler layer and between said second filler layer and said layer of moisture sealant material.

5. A cable for use in marine seismic exploration having a solid construction of coaxially aligned layers disposed over a flexible foundation member, said layers comprising:

first insulating and sealing means for electrically insulating and sealing said foundation member from the entry of moisture; a plurality of hollow, cylindrical, seismic transducers carried internally by said cable in longitudinal spaced relationship; means for providing electrical communication paths to said transducers; flexible filler means disposed over said means for providing electrical communication paths for preventing longitudinal migration of moisture along said cable; second insulating and sealing means disposed over the aforesaid structure for sealing the same from the entry of moisture; and, flotation means for providing a desired buoyancy to said cable.

6. The cable of claim 5 wherein said flexible foundation member comprises a torque balanced wire rope.

7. The cable of claim 5 wherein said flexible filler means comprises a helical coil layer of plastic material of substantially the same thickness as the walls of said seismic transducers.

8. The cable of claim 5 wherein said floatation means comprises a layer of controlled density, cellular, foamed plastic material.

9. A section of marine seismic cable adapted for coupling in end to end relationship and having a solid, coaxially aligned layered construction about a torque balanced wire rope base member, comprising:

a first watertight insulating and sealing layer of plastic material disposed over said wire rope; a plurality of electrical conductors, cable wound over said sealing layer and disposed in a polysulfide first filler layer; a layer of cloth tape material wound over said first filler layer; a plurality of hollow, cylindrical, seismic transducers longitudinally spaced along said cable section and each contacted by a pair of said electrical conductors; a continuous, helical coil layer of polyethylene material of substantially the same thickness as the walls of said transducers and disposed in the longitudinal gaps between said transducers and over said layer of cloth tape material; a layer of plastic tape material wound over said transducers and said helical coil layer; a second watertight insulating and sealing layer of plastic material disposed over said layer of plastic tape material; and, an outer flotation layer of controlled density foamed polyethylene material disposed over said second insulating and sealing layer.

10. A cable construction for use in marine seismic operation comprising a solid cable section having a uniform outer diameter, an outer layer of solid moisture proof flotation material of sufficient thickness to supply a neutral or slightly positive buoyancy to the structure and defining said outer diameter, an inner, sealed, load supporting member, together with a plurality of electrical conductors surrounded by a first filler material, and a second filler material over said first filler material and tractably arranged about a longitudinal axis of said cable section to permit flexing of the cable section.

11. The cable construction of claim 10 and further including a plurality of hollow, cylindrical, seismic transducers disposed interiorly in said cable section at longitudinally spaced intervals.

12. A cable construction for use in marine seismic operations comprising a solid cable section having a uniform outer diameter, an inner, sealed, load supporting member, together with a plurality of electrical conductors surrounded by a first filler material, and a second filler over said first filler, said second filler comprising a helical coil of material, thereby permitting flexing of the cable section.

References Cited

UNITED STATES PATENTS

| 2,837,731 | 6/1958 | Harris | 340—7 |
| 3,272,910 | 9/1966 | Flint | 174—101.5 |
| 3,434,104 | 3/1969 | Stapleton et al. | 340—7 |

RODNEY D. BENNETT, Primary Examiner

D. C. KAUFMAN, Assistant Examiner

U.S. Cl. X.R.

174—101.5; 181—0.5